United States Patent [19]

Amos et al.

[11] Patent Number: 4,762,373

[45] Date of Patent: Aug. 9, 1988

[54] PROCESS FOR ROUNDING THE BRISTLE TIPS OF TOOTHBRUSHES AND TOOTHBRUSHES PREPARED BY THIS PROCESS

[75] Inventors: Walter Amos, Wiesbaden; Horst Klein, Kelkheim-Fischbach, both of Fed. Rep. of Germany

[73] Assignee: Blendax-Werke R. Schneider GmbH & Co., Mainz, Fed. Rep. of Germany

[21] Appl. No.: 903,762

[22] Filed: Sep. 5, 1986

[30] Foreign Application Priority Data

Sep. 20, 1985 [DE] Fed. Rep. of Germany ....... 3533533

[51] Int. Cl.$^4$ .............................................. A46D 1/04
[52] U.S. Cl. ................................ 300/21; 219/121.73; 264/26
[58] Field of Search ...................... 300/17, 21; 264/26; 219/121 L, 121 LM, 121 LP; 15/167.1

[56] References Cited

U.S. PATENT DOCUMENTS

| 2,386,966 | 10/1945 | MacMillin | 264/26 |
| 4,147,488 | 4/1979 | Chiron | 264/26 X |
| 4,441,227 | 4/1984 | d'Argembeau | 300/21 X |
| 4,613,470 | 9/1986 | Aftalion | 264/26 X |

FOREIGN PATENT DOCUMENTS 1453829 9/1966 France .................... 300/21

Primary Examiner—P. W. Echols
Assistant Examiner—Joseph M. Gorski
Attorney, Agent, or Firm—Birch, Stewart, Kolasch & Birch

[57] ABSTRACT

The present invention relates to a method for rounding the bristle tips of toothbrushes by the action of laser radiation, characterized in that the rounding process is effected in an electrostatic field, thus avoiding the fusion of the individual bristles as well as the formation of a mushroom-like bristle tip.

5 Claims, 1 Drawing Sheet

U.S. Patent     Aug. 9, 1988     4,762,373
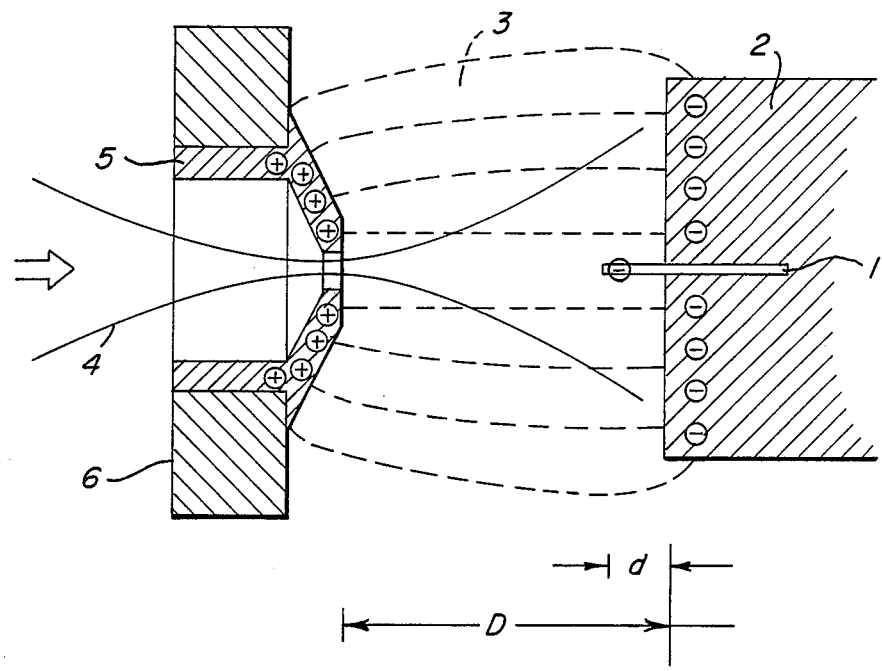

PROCESS FOR ROUNDING THE BRISTLE TIPS OF TOOTHBRUSHES AND TOOTHBRUSHES PREPARED BY THIS PROCESS

The present invention relates to an improved process for rounding the bristle tips of toothbrushes and to toothbrushes prepared by this process.

For a long time it has been known to round off the bristle ends of toothbrushes after having completed the insertion process. This operation, being necessary to avoid that the gums are damaged through pointed bristle ends, is normally done by mechanical grinding and/or thermal treatment of the brush heads after insertion of the bristles which have been cut to uniform length. However, it has been found that this treatment method does not always lead to satisfactory results concerning the uniformity of the rounded bristle tips in the bristle field of the toothbrush head.

For this reason, it has also been proposed to round off the bristle ends by the action of laser radiation (EP-A No. 60 592). When trying to realize this proposal in a technical scale, it was found that, apparently due to fusion processes, mushroom-shaped bristle ends were obtained, whose diameter was much larger than the diameter of the individual filaments. However, bristle tips with such a large diameter cannot be tolerated as they prevent the bristles from penetrating into the interdental spaces and thus prevent the interdental spaces from being thoroughly cleaned.

Moreover, is has been found that the undifferentiated use of laser radiation for rounding the bristle tips of toothbrushes results in a fusion of adjacent bristles, thus making the toothbrush unusable.

The object of the present invention is to avoid these disadvantages.

The solution of this problem consists in effecting the rounding of the bristle tips of toothbrushes by laser radiation in an electrical field.

In the following, a preferred embodiment of the invention is described in detail:

The bristle head of a conventionally manufactured toothbrush is charged with electrons. Then, laser radiation frontally acts upon the bristle head while the bristles are in an electrostatic field. The charged, fused bristle tip is attracted by the complementarily charged electrode (anode) and thus is brought into a longish, ellipsoid form. The diameter of the rounded bristles is, if at all, only slightly higher than the diameter of the individual filament before treatment.

The FIGURE schematically describes the treatment method:

A single bristle (1), e.g. consisting of a polyamide fiber, which was negatively charged by a copper cathode (2), is in an electrostatic field (3), where during the frontal action of a focusing laser ray (4) a positive charge is exerted by a copper anode (5). So the negatively charged bristle tip (1) extends toward the anode (5) during the fusion process (6=holding device).

The preferred distance D between the electrodes is between approx. 0.2 and approx. 3 cm.

The preferred field intensity was determined from approx. 3 kV/cm to approx. 12 kV/cm; while the preferred laser intensity is between approx. 5 W/cm$^2$ to approx. 150 W/cm$^2$.

The laser radiation source may be a well known solid-state or gas laser, preferably a $CO_2$ laser.

What is claimed is:

1. A method of rounding bristle tips of a toothbrush by laser radiation which comprises subjecting said bristle tips of said toothbrush to said laser radiation in an electrostatic field.

2. A method according to claim 1 wherein said laser radiation is derived from a solid-state laser.

3. A method according to claim 1 wherein said laser radiation is derived from a $CO_2$ laser.

4. A method according to claim 1 wherein said electrostatic field has an intensity of from about 3 kV/cm to 12 kV/cm.

5. A method according to claim 1 wherein said laser radiation has a laser intensity of from about 5 W/cm$^2$ to about 150 W/cm$^2$.

* * * * *